United States Patent
Liu et al.

(10) Patent No.: US 10,915,575 B2
(45) Date of Patent: Feb. 9, 2021

(54) EVALUATING XML FULL TEXT SEARCH

(71) Applicant: Oracle International Corporation, Redwood Shores, CA (US)

(72) Inventors: Zhen Hua Liu, San Mateo, CA (US); Ying Li, Sunnyvale, CA (US); Hui Joe Chang, San Jose, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 13/783,141

(22) Filed: Mar. 1, 2013

(65) Prior Publication Data

US 2014/0095519 A1   Apr. 3, 2014

Related U.S. Application Data

(60) Provisional application No. 61/707,772, filed on Sep. 28, 2012.

(51) Int. Cl.
G06F 16/835 (2019.01)

(52) U.S. Cl.
CPC .............. G06F 16/8373 (2019.01)

(58) Field of Classification Search
CPC ......... G06F 17/30864; G06F 17/30911; G06F 17/2705; G06F 16/951; G06F 16/81; G06F 16/8373
USPC ........................................ 707/770, 741, 755
See application file for complete search history.

(56) References Cited

U.S. PATENT DOCUMENTS

| | | | | |
|---|---|---|---|---|
| 5,926,812 A | * | 7/1999 | Hilsenrath | G06F 17/3071 707/737 |
| 7,257,569 B2 | * | 8/2007 | Elder | G06F 17/30722 707/999.003 |
| 7,499,915 B2 | * | 3/2009 | Chandrasekar | G06F 17/2205 |
| 8,086,606 B1 | * | 12/2011 | Xu | 707/736 |
| 8,549,006 B2 | * | 10/2013 | Amer-Yahia et al. | 707/741 |

(Continued)

FOREIGN PATENT DOCUMENTS

WO   WO 2017/070188 A1   4/2017

OTHER PUBLICATIONS

Zemmar et al., "A Survey of Indexing Techniques in Natives XML Databases", Inernational Arab Conference on Information Technology, dated Dec. 11, 2011, 8 pages.

(Continued)

Primary Examiner — Jensen Hu
(74) Attorney, Agent, or Firm — Hickman Palermo Becker Bingham LLP

(57) ABSTRACT

Methods and systems for improved query evaluation in computer systems are provided. A system receives a full text query for evaluation against a collection of XML documents. The query comprises specifies one or more tokens and one or more contexts. The contexts each represent a path within an XML expression. The query is used to make multiple determinations. First, determining, using token lists, first documents that contain the tokens included in the query. Second, determining, using tag lists, second documents that contain the contexts included in the query. Third, determining third documents by comparing the first documents and the second documents to determine which documents contain both the tokens and the contexts. The query is then evaluated in view of the third documents.

18 Claims, 6 Drawing Sheets

(56) References Cited

U.S. PATENT DOCUMENTS

| | | | | |
|---|---|---|---|---|
| 2005/0228791 | A1* | 10/2005 | Thusoo | G06F 16/81 |
| 2006/0015482 | A1* | 1/2006 | Beyer | G06F 17/30067 707/999.003 |
| 2006/0036657 | A1* | 2/2006 | Cheslow | G06F 16/8373 |
| 2006/0064432 | A1* | 3/2006 | Pettovello | G06F 16/81 |
| 2008/0010256 | A1* | 1/2008 | Lindblad | G06F 16/81 |
| 2008/0120283 | A1* | 5/2008 | Liu | G06F 16/83 |
| 2008/0243799 | A1* | 10/2008 | Rozich | G06F 17/30864 707/999.003 |
| 2009/0177960 | A1* | 7/2009 | Lemoine | G06F 17/30938 707/999.003 |
| 2011/0179016 | A1* | 7/2011 | Narula | G06F 17/30424 707/770 |
| 2018/0075105 | A1 | 3/2018 | Chavan et al. | |

OTHER PUBLICATIONS

McHugh et al., "Lore: A Database Management System for Semistructured Data", SIGMOD Record, vol. 26, No. 3, Sep. 1997, 14 pages.

Mathis et al., "XML Indexing and Storage: Fulfilling the Wish List", Computer Science Res Dev. Springer Published Online Feb. 1, 2012, 18 pages.

Kaushik et al., "On the Integration of Structure Indexes and Inverted Lists", SIGMOD dated Jun. 13-18, 2004, AMC, 12 pages.

Wikipedia, "B+ Tree", dated Sep. 25, 2012, https://en.wikipedia.org/windex.php?title=B+_tree&oldid=514568173, 6 pages.

Anonymous:, "Intverted Index—Wikipedia", dated Jan. 9, 2016, https://en.wikipedia.org/w/index.php?title=Inverted_index&oldid=698960983, 4 pages.

McHugh et al., "Lore: A Database Management System for Semistructured Data", SIGMOD, vol. 26 No. 3, dated Sep. 3, 1997, 14 pages.

Yu et al., "Two birds, one stone: a fast, yet lightweight, indexing scheme for modern database systems", dated Nov. 2016, 5 pages.

Wu et al., "Ginix: Generalized Inverted for Keyword Search", IEEE Transactions on Knowledge and Data Mining vol. 8 No. 1 Year 2013, 11 pages.

Wan et al., "When Optimizer Chooses Table Scans: How to Make Them More Responsive", ACM, dated 2018 Association for Computing Machinery, 10 pages.

Twitter Blog, "Dremel made simple with Parquet", dated Sep. 11, 2013, https://blog.twitter.com/engineering/en_us/a/2013/dremel-made-simple-with-parquet.html, 12 pages.

Patil et al., "Inverted Indexes for Phrases and Strings", SIGIR'11, Jul. 2011, ACM, Beijing, China, 10 pages.

Niwattanakul et al., "Using of Jaccard Coefficient for Keywords Similarity", International MultiConference of Engineers and Computer Scientists 2013 vol. I, dated Mar. 2013, 6, pages.

Microsoft Docs, "Query with Full-Text Search", dated Mar. 14, 2017, 12 pages.

Microsoft Docs, "Columnstore indexes—Query performance", dated Jan. 11, 2019, https://docs.microsoft.com/en-us/sql/relational-databases, 11 pages.

Manber et al., "GLIMPSE: A Tool to Search Through Entire File Systems", TR 93-34, dated Oct. 1993, 11 pages.

Kononenko et al., "Mining Modern Repositories with Elasticsearch", MSR '14, May 31-Jun. 1, 2014, Hyderabad, India, 4 pages.

Kanchan et al., "Survey paper on Generalized Inverted Index for Keyword Search", e-ISSN: 2278-067X, p-ISSN: 2278-800X, www.ijerd.com, vol. 10, Issue 4 (Apr. 2014), pp. 69-73.

GitHub.com, "Analytics querying performance (aka, think about what to do with analytics)", https://github.com/18F/api.data.gov/issues/235, dated May 26, 2015, 27 pages.

GitHub, "Parquet", parquet-format/README.md, last viewed on Jul. 15, 2020, https://github.com/apache/parquet-format/blob/f1de77d31936f4d50f1286676a0034b6339918ee/README.md 9 pages.

Biatecki et al., "Apache Lucene 4", SIGIR 2012 Workshop on Open Source Information Retrieval. Dated Aug. 16, 2012, Portland, OR USA., 8 pages.

Aizawa, Akiko, "An information-theoretic perspective of tf-idf measures", Information Processing and Management 39, dated 2003, 21 pages.

Kotsakis, Evangelos, "XSD: A Hierarchical Access Method for Indexing XML Schemata", Knowledge and Information Systems dated 2002, 34 pages.

* cited by examiner

EVALUATING XML FULL TEXT SEARCH

BENEFIT CLAIM

Cross-Reference to Related Applications

This application claims the benefit of Provisional Appln. 61/707,772, filed Sep. 28, 2012, the entire contents of which is hereby incorporated by reference as if fully set forth herein, under 35 U.S.C. § 119(e).

TECHNICAL FIELD

The present invention relates to XML full-text search.

BACKGROUND

Marked Up Data

Applications often store data as text documents with contextual clues provided within the text. A "context" may be provided for a data value by tagging or labeling the data value within the text. The context for a data value may be provided by a single label or a combination of labels, such as a hierarchical path of labels. In one example, a value of "Tom" may be prefaced with a label of "Name". Various markup signals may be used to distinguish between the data values and the labels themselves. For example, a label may be marked with a "//", such as in "//Name Tom," or a "-", such as in "-Name Tom". In many markup languages, the label is provided within angle brackets, such as in "<Name>Tom." The end of the data value may also be marked. For example, the end may be marked with "</Name>." The end may also be marked by the beginning of another label, for example "-Name Tom-Age 25". The marked up data may indicate a hierarchical structure such that a single data value falls under a path of labels, such as in "<CONTACT><NAME>Tom</NAME></CONTACT>," where "Tom" falls under the path of "CONTACT/ NAME." Alternately, data values may be marked with individual labels that do not specify a hierarchical path, such as in "-Name Tom-Age 25." Extensible Markup Language (XML) is an example markup language that is used to provide context for data.

XML

Extensible Markup Language (XML) is a World Wide Web Consortium (W3C) standard for representing data. Many applications are designed to output data in the form of XML documents. Various techniques may be used to store data from such XML documents into a relational database. XML serves as an exemplary markup language that may be used with the techniques described herein.

XML data comprises structured data items that form a hierarchy. In XML, data items known as elements are delimited by an opening tag and a closing tag. An element may also comprise attributes, which are specified in the opening tag of the element. Text between the tags of an element may represent any sort of data value, such as a string, date, or integer. An element may have one or more children. The resulting hierarchical structure of XML formatted data is discussed in terms akin to those used to discuss a family tree. For example, a sub-element is said to descend from its parent element or any element from which its parent descended. A parent element is said to be an ancestor element of any sub-element of itself or of one of its descendant elements. Collectively, an element along with its attributes and descendants, are referred to as a tree or a sub-tree.

XML Query and XPath

XML Query Language (XQuery) and XML Path Language (XPath) are standards for querying and referencing XML content. XQuery and XPath can be used in conjunction with a structured query language such as SQL to express a large variety of useful queries to search within XML data. This is known as SQL/XML: I.O. for Standardization (ISO). The entire contents of the specification entitled, "Information Technology-Database Language SQL-Part 14: XML-Related Specifications (SQL/XML)," dated Jul. 21, 2005, available at the time of writing at http://www.sqlx.org/SQL-XML-documents/5FCD-14-XML-2004-07.pdf, is incorporated by reference as if fully set forth herein. Example XPath functionality is described in the W3C Recommendation of Nov. 16, 1999, entitled "XML Path Language (XPath), version 1.0," available at the time of writing at http://www.w3.org/TR/xpath, the entire contents of which is incorporated by reference as if fully set forth herein. Example XPath functionality is also described in the W3C Recommendation of Jan. 23, 2007, entitled "XML Path Language (XPath) 2.0," available at the time of writing at http://www.w3.org/TR/xpath, the entire contents of which is incorporated by reference as if fully set forth herein. Example XQuery functionality is described in the W3C Recommendation of Jan. 23, 2007, entitled "XQuery 1.0: An XML Query Language," available at the time of writing at http://www.w3.org/TR/xquery, the entire contents of which is incorporated by reference as if fully set forth herein.

Path Expressions

The structure of an XML document establishes parent-child relationships between the nodes within the XML document. The "path" for a node in an XML document reflects the series of parent-child links, starting from a "root" node, to arrive at the particular node. For example, the path to the ID node in a document that includes "<CONTACT> . . . <ACCOUNT> . . . <ID> . . . </ID> . . . </ACCOUNT> . . . </CONTACT>" is /CONTACT/ACCOUNT/ID, since the "ID" node is a child of the "ACCOUNT" node, and the "ACCOUNT" node is a child of the "CONTACT" node.

Storing and Querying XML Data

A large portion of XML data is stored in databases as unstructured database objects that store the data as a single item of raw text. For example, XML data is frequently stored in unstructured database columns such as character large object (CLOB) columns, variable character field (VARCHAR) columns, or binary large objects (BLOB) columns. A full-text search may be performed on CLOB, VARCHAR, and BLOB columns of a table by submitting a database query that causes a database server to perform a full-text search on the columns. A full-text search on CLOB, VARCHAR, and BLOB columns is performed by scanning the entire column for a specified text value. Alternately, in order to more efficiently process the query, the database server may use a text index that associates the text value with one or more of the rows that contain the text value. Storing an XML document as a single data item of raw text is convenient in that the user does not even need to know whether or not the data conforms to XML in order to store the data in an unstructured column. The XML data does not need to be processed or decomposed before the XML data is stored in the database, and storing the XML document as a single data item of raw text maintains document fidelity or text fidelity on a byte-by-byte, or character-by-character basis. Because document fidelity is maintained, the storage of an XML document as a single data item of raw text may be accomplished without interfering with applications, developers, or users that utilize the original XML document.

Text-based search over data items of raw text, such as CLOB columns, VARCHAR columns, or BLOB columns, is efficient for basic keyword searches, but text-based search does not address a context in which the keywords occur in the XML document. When XML documents are stored as raw text in an unstructured column, database servers have been unable to take advantage of the fact that XML documents contain tagged content, where a single XML document may include a variety of named attributes and elements with specific data values.

XML Type Data

An XML document may be shredded into its constituent attributes and elements before the XML document is stored in the database. For example, documents that conform to XML may be stored in an XMLType datatype column in the relational database, as described in U.S. Pat. No. 7,024,425, entitled "Method And Apparatus For Flexible Storage And Uniform Manipulation of XML Data In A Relational Database System," the entire contents of which is incorporated by reference as if fully set forth herein. When the XML document is stored in the XMLType column, the database server maps attributes and elements of the XML document to separate columns in the relational database, and the database server stores mapping information that maps the attributes and elements of the XML document to the columns in the relational database where the attributes and elements are actually stored. The storage of data as XMLType causes the data to be decomposed into relational objects that represent nodes of XML content. The database server presents the XML document as a single data item of the XMLType abstract datatype even though separate attributes and elements of the XML document are mapped to the separate relational columns. If an XML user submits a query to search XML documents for a value of a particular element, then the XML user's query is rewritten to access the relational column that holds values for the particular element.

If there is no relational column that holds the values for the particular element searched for, then the value may be found in a CLOB subsumed within an XMLType item in an XMLType column. The CLOB portion of the XMLType item is not exposed to the user as a CLOB column, and, because the CLOB portion is within the XMLType item, only data that conforms to XML may be stored in such a CLOB portion. XMLType preserves DOM (Document Object Model) fidelity by allowing a structured representation of the document to be constructed by scanning the entire document. A DOM is a structured representation of the entire XML document that is constructed in memory when XML data stored in a CLOB portion of an XMLType item is accessed using a path-based expression. The DOM provides information about hierarchical relationships between nodes within the document. XQuery may be used to search XMLType data in a manner that is aware of the context in which the text occurs in XML documents.

Document Traversal Index

For structured content, indices may be created to mark locations of nodes within the structured content, and to allow traversal from node to node without scanning all of the content between nodes. A document traversal index such as the XML Tree Index stores node entries that specify the location of the node in the document, and links to similar entries for related nodes, such as the root node, parent/ancestor node(s), sibling node(s), or child/descendant node(s). Example XML Tree Index functionality is described in U.S. Pat. No. 8,266,151, entitled "Efficient XML Tree Indexing Structure Over XML Content," the entire contents of which is incorporated by reference as if fully set forth herein; U.S. Patent Application Publication Number 2011/0302189, entitled "Providing Context Aware Search Adaptively," the entire contents of which is incorporated by reference as if fully set forth herein; and U.S. Patent Application Publication Number 2011/0302198, entitled "Searching Backward To Speed Up Query," the entire contents of which is incorporated by reference as if fully set forth herein.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Full Text Search

Full-text search may be performed over marked-up or structured content, as well as unstructured content. XQuery and XPath Full Text (XQFT) search extends XQuery 1.0 and XPath 2.0 to provide full-text search capabilities for XML content. Example XQFT functionality is described in the W3C Recommendation of Mar. 17, 2011, entitled "XQuery and XPath Full Text 1.0," the entire contents of which is incorporated by reference as if fully set forth herein. The W3C Recommendation defines the syntax and formal semantics of XQuery and XPath Full Text 1.0.

XQFT searches for tokens and phrases rather than substrings. An example substring search for "Tom" might return "Tom," "Tomorrow," "Tomato," "Tomcat," "Tomb," and/or "Tomahawk." To facilitate XQFT searches, documents are broken up into tokens (i.e., units of a string or delimited words such as the words in a sentence) that are processed separately. XQFT searches are evaluated by matching tokens from the search query to tokens in the documents. For example, an XQFT search for "Tom" would return only those documents that include tokens matching "Tom," thereby excluding "Tomorrow," "Tomato," "Tomcat," "Tomb," and/or "Tomahawk."

XQFT searches may also search for other words with a similar meaning, sound, linguistic stem, or origin, or words that are otherwise related to the searched words. For example, a search for "mouse" may result in documents that contain "mouse," "mice," "rodent," "rodents," "computer mouse," "ratón" ("mouse" in Spanish), "souris" ("mouse" in French), "Maus" ("mouse" in German), etc.

XQFT searches may also allow for intervening token(s) between the searched tokens, or may allow the searched tokens to appear out of order. For example, a search for "San Jose Sharks" may result in documents that contain " . . . Sharks in San Jose.," or " . . . in San Jose. The Sharks . . . ."

XQFT searches may also rank results based on relevance. For example, documents with several exact matches may appear at the top of a list of results, and documents with few near-matches may appear at the bottom of the list. Term proximity in a document or paragraph, term frequency in the document or paragraph, term prominence or placement in the document or paragraph, contextual similarity of the term with the searched term, and other factors may contribute to the ranking of search results.

DETAILED DESCRIPTION

Figure 1:
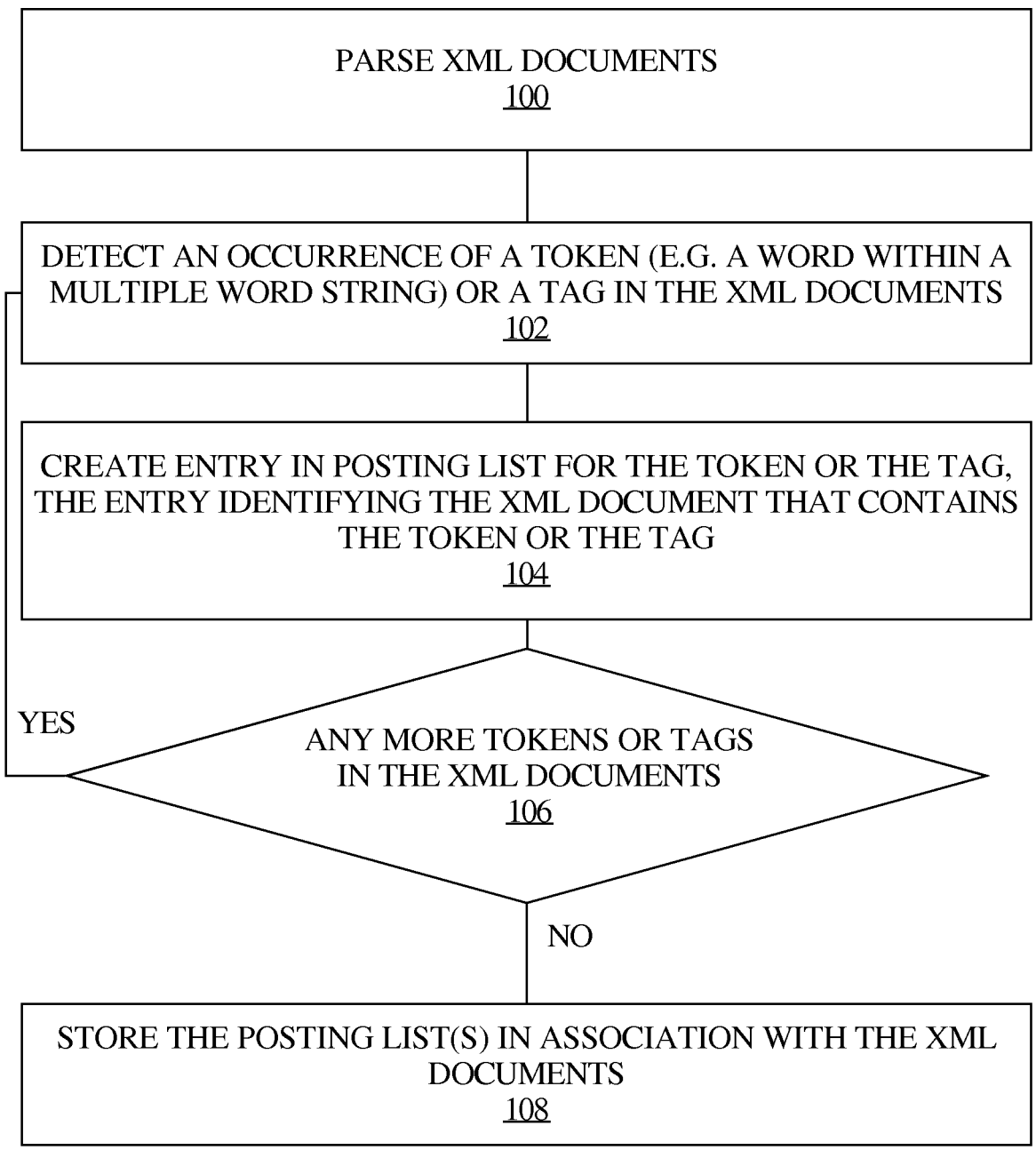
FIG. 1 illustrates an example process for creating posting lists for tags or tokens in XML documents.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Processes, machines, and stored instructions are provided for storing posting lists for tokens in XML document(s) and using the posting lists to process queries. A document processor parses XML document(s) and, for each occurrence of a token in the XML document(s), adds an entry to a list for the token. The entry for the token maps the token to document(s), location(s), range(s), or node(s) within the document(s) where the token(s) can be found. The document processor may also detect tag(s) in the XML document(s) and, for each occurrence of a tag, add an entry to a list for the tag. The entry for the tag may also specify document(s), location(s), range(s), or node(s) within the document(s) that are covered by the tag.

A query processor may then receive a full text query for evaluation against XML document(s). The full text query specifies token(s) and context(s). The query processor may determine a first set of one or more documents, location(s), range(s), or node(s) within document(s) that contain the token(s) by using token list(s) that specify such information for the specified token(s). The query processor may also determine a second set of one or more documents, location(s), range(s), or node(s) within document(s) that contain the context(s) by using tag list(s) that specify such information for the specified token(s). Then, the query processor may determine a third set of document(s) or node(s) within document(s) that contain both the token(s) and the context(s) based at least in part on the first set of document(s) or node(s) and the second set of document(s) or node(s). The query may then be evaluated based at least in part on the third set of document(s) or node(s).

In one embodiment, an XML document is parsed, and, for each occurrence of a token in the XML document, a document processor adds an entry to a list for the token The entry maps the token to a location of a parent node that contains the token in the XML document. A query processor may then receive a full text query for evaluation against the XML document. The query processor then uses the token lists to determine location(s) of parent node(s) that contain token(s) specified by the query. The query processor may then traverse a node tree index away from the parent node(s) to determine whether the parent node(s) satisfy context(s) specified by the query. In the same or a different embodiment, the query processor may first determine node(s) or range(s) of locations of the node(s) that match the context(s) specified in the query and then use the token list(s) to determine whether the token(s) are under the determined node(s) or within the range(s) of locations of the node(s).

Figure 5:
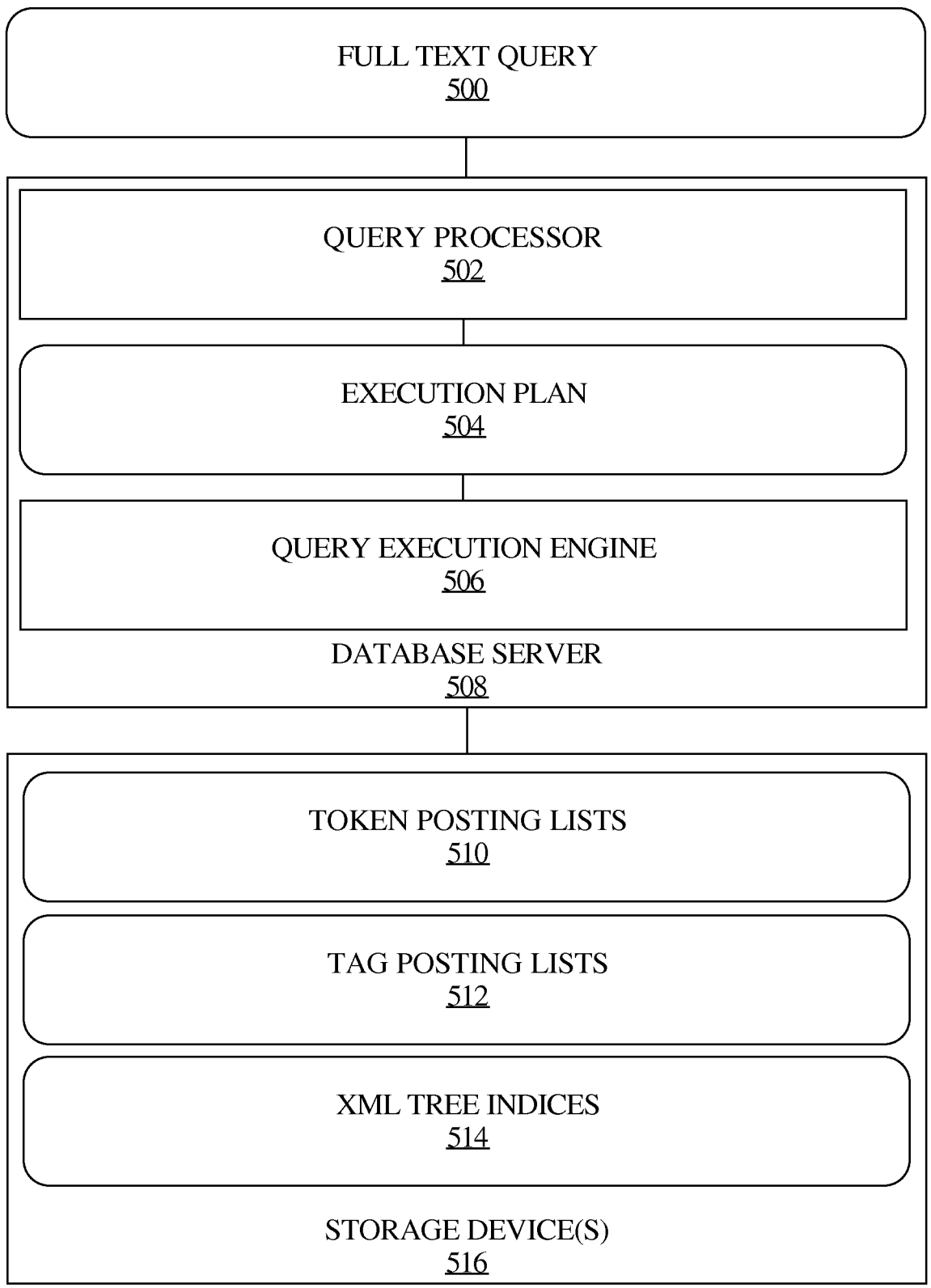
FIG. 5 illustrates an example system for evaluating a full text query using posting lists.

FIG. 5 illustrates an example system for evaluating a full text query using posting lists. As shown, a full text query is received by a database server 508 at a query processor 502. Query processor 502 generates an execution plan 504 that instructs the query execution engine 506 how to execute the query. For example, the execution plan may instruct query execution engine 506 to perform some operations before others, or to use certain indices to perform certain portions of the query. Query processor 502 and/or query execution engine 506 may have access to storage device(s) 516, which may include an allocated portion of memory in database server 508, disk storage in an underlying database, or some other non-transitory storage. Query processor 502 may instruct query execution engine 506 to use token posting lists 510, tag posting lists 512, and XML tree indices 514 to compute results for full text query 500.

First Approach of Scanning Documents Row-by-Row

XQuery FullText has become the recommended standard way of querying XML with full text search support by W3C XQuery working group. The SQL/XML standard, which defines the standard operators in SQL to process XML type in RDBMS, has defined to use XMLQuery( ), XMLExists( ), XMLTABLE construct with XQuery full text to semantically search text within XML documents that are stored in XMLType column of a relational table.

Various techniques described herein allow users to use the standard XMLQuery( ), XMLExists( ), and XMLTABLE constructs in SQL/XML to do xquery full text search over XML.

Therefore, a set of techniques are provided that capture both indexing technique and SQL/XML query compile time and run time optimizations to optimize XQuery Full Text operations used in SQL/XML query that searches XML documents in XMLType storage. These optimization techniques are diagnosable by end users via explain plans and event tracing.

In one example, a table PO is created that has an XML-Type column X storing purchaseOrder XML documents:

Create table po (x xmltype);

The user can issue the following SQL SELECT statements with XQuery Full Text search in XMLExists( ) and XMLQuery( ) to search purchaseOrder XML documents:

Q1: SELECT XMLQUERY('for $li in $doc/purchaseOrder/lineItems where $li/description contains text "iPhone 5"

return $li'PASSING PO.X as "doc" RETURNING CONTENT) FROM PO WHERE XMLEXISTS('$doc/purchaseOrder/lineItems[description contains text "iPhone 5"] 'PASSING PO.X as "doc")

According to a first approach, this SELECT statement could be processed separately on a row-by-row basis for each row of XML content from the PO table. A query processor would perform a functional evaluation of the query by compiling the query into an execution plan that uses a document object model (DOM) for each document. For each row, a query processor would run the XQuery full text search in XMLEXISTS( ) to see if the document for that row satisfies the XQuery expression. If a row does satisfy the XQuery expression, then the query processor would return the row by running the XQuery in the XMLQuery( ) operator of the select list on the XML document. In other words, the query or at least a portion thereof is evaluated row-by-row in this example.

Running the XQuery full text search for a given row may involve traversing a DOM tree to first find a purchaseOrder node. The query processor may further search for a lineItem node under each purchaseOrder node that is found in the document, and a description node under each of these lineItem nodes. For each description node that is found, the descendant text nodes are combined into a text object, and the text object is broken up into tokens such as separate words. These tokens are analyzed to determine whether, for example, adjacent tokens contain "iPhone" and "5." If so, the document may be added to the result list. Other documents may be similarly analyzed for other rows as the query is processed.

Functional evaluation of XQFT according to this first approach may have the following limitations:

Each row may be separately fetched from disk, and XQFT functional evaluation is applied separately to each row. This first approach might not scale if there are many XML documents stored in the base table.

Depending on the XMLtype physical storage model, the XML DOM representation may be constructed for each XML document stored in the table because XQFT functional evaluation uses a DOM mode of XMLType. A DOM construction can be computationally expensive (in terms of processor time, memory, and/or input/output) for XML text storage which XML Parser has to be invoked. The DOM construction can be computationally expensive for XML structured (object relational) storage because XML contents are fetched from various storage tables to construct a DOM.

Other approaches are provided as alternatives to the first approach of doing functional evaluation of XQFT by scanning documents row-by-row.

Example Token and/or Tag Indices Approach

In one embodiment, an XMLFullText index or indices are created that may index not only words, but also XML structures (in the form of element and attributes) and their hierarchical relationships. In this way, the keywords and XML path element/attribute tags can be searched together with hierarchical relationship among them.

In one example, the indices are created by creating and storing separate lists for each keyword or token, and separate lists for each unique tag. The lists may cover content from an entire collection of documents, such as all of the documents in an XMLType column, or a subset of those documents. Each token list may include information that identifies the token, such as "iPhone," and recorded location(s) that instance(s) of the token appear in document(s), such as location(s) of beginning(s) of the instance(s) of the token. The token lists may also include information such as an identity of a parent node that contains the instance of the token, or a size of the token. The token lists may exclude all other information, such as hierarchical information, tag information, or node navigation information, or the token lists may include additional information such as this. Keeping the sizes of the token lists and tag lists small reduces I/O between the query processor or database server and the storage device(s) that persistently store the indices or memory device(s) that temporarily store the indices, and/or between the storage device(s) and memory device(s). Token list(s) and/or tag list(s) may be included as part of the same database object or may be maintained as separate objects. For example, different tokens and tags may represent different rows in a table that stores token lists and tag lists. In other examples, one table may store token lists, and another table may store tag lists, or each list may have its own table. Each token or tag list may include hits from multiple documents, and/or multiple hits per document. Some of the lists may be document-specific, for example, by providing information about tag(s) or token(s) in a particular document.

A unique tag may be a tag identifier or a tag name. A tag identifier, such as a QName, identifies a unique namespace and a local name, and different local prefixes may be mapped to the same namespace. The namespace may be unique globally among a collection of documents, and the local name may be re-used in different ways among different documents. A table may store a mapping of prefixes to namespaces for different documents, and this mapping may differ for different documents. In the examples below, documents 1 and 2 have different prefixes mapped to the namespace "a.com," and document 3 has no prefix but maps a tag to the prefix "a.com."

Document 1
<pfx:po xmlns:pfx="a.com">mytext</pfx:po>
Document 2
<xyz:po xmlns:xyz="a.com">mytext</xyz:po>
Document 3
<po xmlns="a.com">mytext</po>

In an example XQuery, "declare element namespace uvw="a.com";/uvw:po[. contains text "mytext"]," the result should match all documents even though the query references "uvw" instead of "pfx" or "xyz." The prefix information may or may not be retained in a list for the tag identifier, such as a list for the tag identified by namespace "a.com" and local name "po."

In one embodiment, if no namespace is referenced for a given node, a query processor may map the node to an empty namespace or use a local name rather than the QnodeID for the node. In one embodiment, the QName incorporates a character that cannot be included in a local tag name (i.e., a character that is outside of the local tag name character set) to ensure that there is no collision between local tag names and QNames. For example, the QName may incorporate a "#" character or other syntax, which may not occur in or is not valid for local tag names. In this manner, identifiers that refer to a (namespace, local name) combination may be distinguished from local names that are not in namespaces, without any other special distinction between the two.

For tag names that do not reference a namespace, the local tag name may be used to identify the tag. For example, the tag "<CONTACT>John Smith</CONTACT>" may be identified as "CONTACT" in a tag list for the CONTACT tag.

Each tag list may include information that identifies the tag, such as the tag name or tag identifier, and recorded location(s) or range(s) of locations(s) that the tag appears in document(s). A range for a tag may cover the region from where the beginning of the tag occurs in a document to where the end of the tag occurs in the document, and may or may not include the tag itself. The tag lists may exclude all other information, such as token information, hierarchical information, or node navigation information, or the tag lists may include additional information such as this. In a search for given token(s) that match given context(s), a larger set of documents may be narrowed down, using the lists, to those documents that contain items matching each of the separate token(s) and/or context(s). Similarly, a set of possible locations, ranges, or nodes in a document may be narrowed down to only those locations, ranges, or nodes that contain the token(s) and/or match the context(s). Each document that contains items matching each of the separate token(s) and/or context(s) may be further processed using the lists to determine whether the token(s) are within the context(s).

For example, a search for keywords $k_1$ and $k_2$ under context $c_1$ may cause a query processor to determine, optionally in parallel: (1) using a stored list for $k_1$, set $s_1$ of all documents and/or locations, ranges, or nodes within the documents that contain $k_1$, regardless of whether $k_1$ appears in text with $k_2$ or under context $c_1$; (2) using a stored list for $k_2$, set $s_2$ of all documents and/or locations, ranges, or nodes within the documents that contain $k_2$, regardless of whether $k_2$ appears in text with $k_1$ or under context $c_1$; (3) using a stored list for $c_1$, set $s_3$ of all documents and/or locations, ranges, or nodes within the documents that contain $c_1$, regardless of whether $c_1$ contains $k_1$ or $k_2$. Sets $s_1$, $s_2$, and $s_3$ can be logically AND-ed to find set $s_4$ of all documents and/or locations, ranges, or nodes within the documents that contain $k_1$, $k_2$, and $c_1$, regardless of whether $k_1$ and $k_2$ appears in text under context $c_1$ in those documents, locations, ranges, or nodes.

The lists may also be used to determine whether $k_1$ and $k_2$ appears in text under context $c_1$ in those documents, locations, ranges, or nodes. For example, for each recorded range of locations for $c_1$ in documents that contain $k_1$ and $k_2$, the query processor may compare the range (from the list for $c_1$) to the location(s) of $k_1$ and $k_2$ in those documents (from the lists for $k_1$ and $k_2$) to determine whether the locations fall within the range. If so, then $k_1$ and $k_2$ appear within $c_1$ in that document. The determination of whether $k_1$ and $k_2$ appear within $c_1$ in a document may be performed for any documents known to contain $k_1$, $k_2$, and $c_1$, regardless of whether the entire set $s_4$ has been or is ever determined.

The lists for $k_1$ and $k_2$ may also be used to determine whether $k_1$ and $k_2$ appear adjacent to each other. The sizes of $k_1$ and $k_2$ in the text may be determined from the token itself, such as "iPhone," or from stored information about the sizes of $k_1$ and $k_2$, optionally in the lists. For example, because "iPhone" is 6 characters, the query processor can determine whether $k_2$ appears immediately after $k_1$ by determining whether $k_2$ begins immediately after or shortly after 6 characters from the stored location of the beginning of $k_1$. The proximity of $k_1$ and $k_2$ in matching documents may be determined serially or in parallel with the other determinations, for those documents known to contain both $k_1$ and $k_2$.

FIG. 1 illustrates an example process for creating posting lists for tags or tokens in XML documents. In step 100, an XML parser parses XML documents. The XML parser detects, in step 102, an occurrence of a token or a tag in the XML documents. In step 104, the XML parser creates an entry in a posting list for the token or the tag. The entry may be for an existing posting list or a new posting list. The entry identifies the XML document that contains the token or the tag. The entry may also include other information such as a location or range of the token or the tag in the containing document. In step 106, the XML parser continues parsing the XML documents to determine whether there are any more tokens or tags in the XML documents. If there are more tokens or tags to parse, the process continues at step 102. Otherwise, the process continues to step 108, where the XML parser stores the created posting lists in association with the XML documents.

XQFT Search Using the Token and/or Tag Indices

The XMLFullText index exposes index search primitives to the SQL/XML query processing layer so that it can leverage XML Full Text Index to satisfy XMLExists( ) query in the WHERE clause. XML Full Text index is used as pre-filter to get a set of candidate documents for post index evaluation, which may be used if the query requests information that cannot be or otherwise is not gleaned from the indices. XML FullText search may return one or multiple documents with one or multiple nodes in the documents. The nodes may include multiple occurrences of the same node or occurrences of different nodes that satisfy the context based on their hierarchical position within the document.

In one embodiment, the lists for each token or tag are posting lists that include a set of docids with token or tag offset or range information. These posting lists are built by a database server that manages storage of the underlying XML documents, and used to support XML full text search on those documents.

In one embodiment, XML element and attribute tags are indexed in a manner similar to tokens, except that the database server maintains offset range information defined by each open and close tag so that hierarchical relationships among tags and tokens can be maintained. A query processor may be configured to evaluate two index primitives HASPATH(xpath) and 'keyword INPATH(xpath)' constructs to support SQL/XML XQFT processing. The HASPATH(xpath) parameter finds only those documents that contain the xpath parameter. The keyword INPATH(xpath) construct causes the query processor to search for only those documents where the searched keyword is within the range of the xpath parameter, according to posting list(s) for tag(s) in the path.

In one embodiment, the XML Full Text Index does not index element or attribute tag names AS IS because the XML document may have namespace declaration(s). In other words, the pure lexical form of element or attribute name may have namespace prefix associated with it, and the XQFT path element may not match the pure lexical form of those names. The database server may maintain a mapping, as part of the XML Full Text Index, between lexical forms of element and attribute names and an identifier of an internal name that is stored in the XML Full Text Index. The SQL/XML XQFT processing layer consults the mapping table maintained by XML Full Text Index and does QName remapping so that the QName passed to the index layer is the mapped internal name.

In one example, a full-text search for a specified token having a specified context in a set of documents may find that documents 10 and 13 have the specified context and documents 4, 5, 7, and 10 have the specified token. In the example, document 10 is the only document that contains both the token and the context. Document 10 may be further analyzed to determine whether the token is within the context in document 10.

For each overlapping document that contains both the specified context and the specified token, a query processor may analyze a word position of the token within the document and a range covered by the context in the document. If the position of the token is within the range covered by the context, then the query processor may determine that the token is under the context.

For multiple tokens in a phrase, the query processor may analyze a position of the multiple tokens in the document to determine whether the tokens are in a specified order, within a specified distance of each other, and/or in a same paragraph. For example, the query processor may filter out pairs of tokens that are not within a threshold distance of each other. The threshold distance may be based on the size of the tokens. In a first example, in a search for "Sacramento Kings," the query processor may search for "Kings" that starts within 12 characters of the beginning of Sacramento, which is 10 characters long. In a second example, in a search for "Palo Alto," the query processor may search for "Alto" that starts within 6 characters of the beginning of Palo, which is 4 characters long. In the examples, a buffer distance of 2 is used to allow for spacing between tokens. In other examples, larger or smaller buffer distances may be used, and the buffer distances may be user-configurable.

Figure 3:
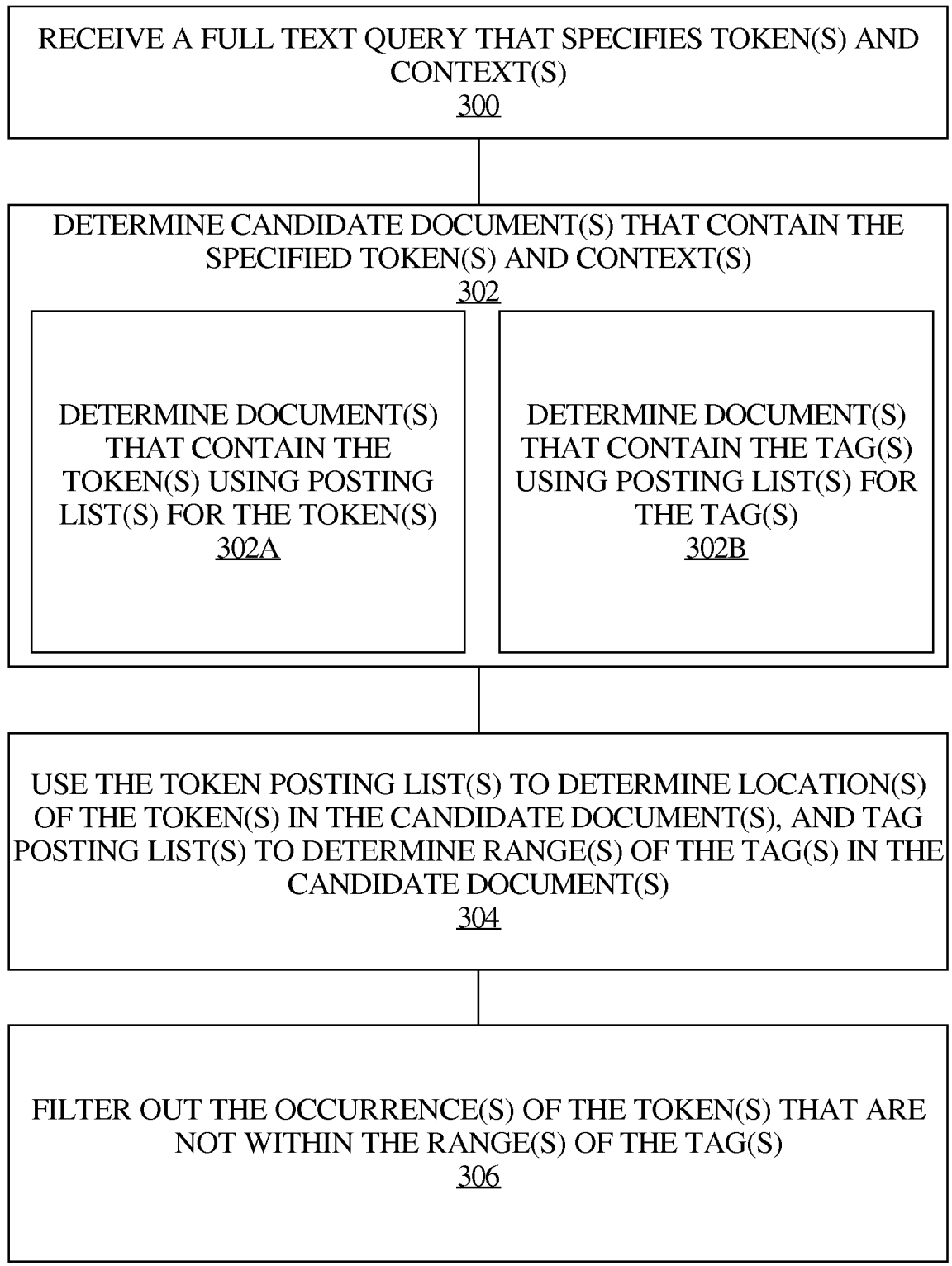
FIG. 3 illustrates an example process for evaluating a full text query against XML documents using postings lists for tokens and posting lists for tags.

FIG. 3 illustrates an example process for evaluating a full text query against XML documents using postings lists for tokens and posting lists for tags. In step 300, a query processor receives a full text query that specifies token(s) and context(s). The query processor then determines, in step 302, candidate documents that contain the specified token(s) and context(s) at least in part by performing steps 302A and 302B, which may be performed in whole or in part serially or in parallel. In step 302A, the query processor determines document(s) that contain the token(s) using posting list(s) for the token(s). In step 302B, the query processor determines document(s) that contain the tag(s) using posting list(s) for the tag(s). Once at least some of the matching documents have been determined, the query processor may, serially or in parallel with a remainder of step 302, use the token posting list(s) to determine location(s) of the token(s) in the candidate document(s), and tag posting list(s) to determine range(s) of the tag(s) in the candidate document(s). Based on these location(s) and range(s), the query processor may filter out the occurrence(s) of the token(s) that are not within the range(s) of the tag(s) in step 306.

Example Document-Level Indexing

In one embodiment, the posting lists for the collection of documents do not provide a result for the entire query. For example, the query may require evaluation on a row-by-row basis in a manner that cannot utilize the progressive filtering effect of the lists. However, posting lists may be utilized even if query evaluation is limited to the evaluation of a single document at a time.

In one embodiment, posting lists are created and retained by the database server on a document-by-document basis, optionally in addition to posting lists for an entire collection of documents. In one example, token lists are created on the document-by-document basis. These document-level posting lists might only contain the token location, for example, identified using the address of a tree node that immediately contains the token (i.e., the immediate parent node as opposed to ancestor tree nodes that contain the immediate parent node).—In other words, in a tree hierarchy where a root node is at a highest level and leaf nodes are at lowest levels, the immediate parent node is the lowest level node that contains the token or an occurrence of the token. Alternatively or additionally, the document-level posting lists might contain information about where the token is located within the immediate parent node, where the token is located within the document as a whole, and/or identities of other ancestor nodes that contain the token and the immediate parent node.

In one embodiment, a document parser parses an XML document and, for each occurrence of a token in the document, adds an entry to a list for the token. The entry may map the token to a location of a parent node that contains the token in the XML document. The parent node may be an immediate parent node of the occurrence of the token. In other words, the parent node may be a lowest level node in the XML document that contains the occurrence of the token. The entry in the list may map the token to the location of the parent node at least in part by identifying an entry in a node tree index for the parent node. The entry for the node tree index stores a location of the parent node in the XML document.

For posting document-level posting lists based on a single document, the document identifier would be the same for each item in the list. Therefore, the document identifier may be stored once for each document-level list rather than for each occurrence of a token or tag that is represented by the list. The XML tag list might not be maintained at the document-level because a document has an XML tree index which identifies each XML node by a tree node address. The tree node address may be stored in a document-level posting list to verify the node containment relationship (i.e., whether the node is under a specified context).

To verify the node containment relationship, the XML tree index may be traversed away from a node that is found to contain the specified context, downwardly towards a node that contains the specified token; or, the XML tree index may be traversed away from a node that is found to contain the specified token, upwardly towards a node that contains the specified context. If the node containing the token is linked to the node containing the context, directly or indirectly through a series of node-to-node links, then the node containing the token may be determined to satisfy a query for the context.

In another embodiment, rather than using document-level lists, posting lists for the collection of documents may be utilized and filtered to find only the information that pertains to a particular document that is being evaluated.

In one embodiment, the token lists that are maintained at the document-level contain information that identifies a location of the node/tag that contains the text and/or the location of the text within the document or node/tag. For example, a token list might specify that text "xyz" is located 20 characters into a node at a particular address. When evaluating a query for "xyz" under a particular context, even if there are no tag lists at the document-level, the token list may be used to identify a node address of the immediate parent of the node that contains "xyz." Then, an XML tree index or DOM model, which may be maintained as an index, may be used to navigate upwardly from that node to ancestor nodes to determine whether "xyz" is within a given context. By navigating upwardly through the hierarchy of the XML document, the query processor may determine whether or not "xyz" is contained within a given context.

In one embodiment, the database server creates and maintains XML tree indices for stored XML documents. An XML Tree index for a document may be used when evaluating documents on a document-by-document basis, or if the text of the document needs to be loaded or analyzed separately from the posting lists in order to finish evaluation of the query. Even if there are no tag lists for a given document, a contextual portion of a query may be evaluated for that document by using the XML tree index to navigate from a given node that contains a searched text upwardly through the hierarchy of nodes within the document.

For example, a query that searches for text under context "A/B/C," the query may use a posting list to determine a location or identity of a node in the document that contains the text. That location or identity of the node may be used to find an entry in the XML tree index or DOM model. The XML Tree index or DOM model may be used to navigate upwardly from the found node to parent node(s), toward the root node. At some point in the navigation, the query processor may be able to determine whether or not the searched text is within the context in the document by using token list maintained at the document level. One way of determining whether the searched text is within the context is to use a bottom-up strategy. For example, if the query processor finds text in the C node, navigates upwardly to the B node, and navigates upwardly to the D node and then to the root node, then the query processor may determine that the text was not contained within the context "A/B/C." However, if the query processor finds text in the C node, navigates upwardly to the B node, and navigates upwardly to the A node, the query processor may determine that the text was within the context "A/B/C."

In another example, the query processor may do a top-down evaluation by finding node addresses of C nodes via XPath "/A/B/C" evaluation first. Then, the query processor may use a token list maintained at the document level to find node addresses P containing the text. Then, the query processor may determine whether walking from node address P upward can reach node address C.

In one example, an XQuery, "/a/b/d[c contains text "tx1" and e contains text "tx2"]," a document with the snippet "<a><b><d><c>txt1</c></d><d><e>txt2</e></d></b></a>" does not satisfy the query, but a document with the snippet "<a><b><d><c>txt1</c><e>txt2</e></d></b></a>" does satisfy the query. In the example, the XML tree index may be traversed from node <e> in each document to discover whether or not the found text is within the specified context "/a/b/d/c."

In another embodiment, a query processor receives a full text query for evaluation against an XML document. The full text query specifies token(s) and context(s). The query processor determines location(s) of parent node(s) that contain the token(s) by using token list(s) that specify the location(s) of the parent node(s) that contain the token(s). The query processor may then traverse a node tree index away from the parent node(s) to determine whether or not the parent node(s) satisfy the context(s). The node tree index may store a plurality of entries comprising, for each parent node, an entry that specifies a location of the parent node within the XML document, and a link to an entry for a node that is a parent of the parent node.

In one embodiment, a query processor receives a full text query for evaluation against an XML document. The full text query specifies token(s) and context(s). The query processor may first determine range(s) of node(s) that match the context(s) in a path-based evaluation. The path-based evaluation may use a path-based index or may analyze a model of the document to determine which nodes could satisfy the context(s) specified in the query. The query processor may then determine whether the range(s) contain the token(s) by using token list(s) that specify location(s) of parent node(s) that contain the token(s). If the location of a parent node is within a range of the range(s), the parent node may be determined to be within the range(s). Some of the ranges may include nodes other than the parent node(s). For example, a particular range may include the parent node and other node(s) that nest the parent node within the context(s). In a particular example, a search for nodes within the path "A/B" may be matched by a D node that is nested under a C node, which, in turn, is nested under the B node. In the example, the path to the parent D node would be "A/B/C/D," and this node may be determined to match the context(s) and contain the token(s) specified in the query.

The query processor may generate a result of the query based at least in part on whether or not the parent node(s) satisfied the context(s). For example, information from or about node(s) that immediately contained the token(s) and satisfied the context(s) may be included in the query result.

Figure 2:
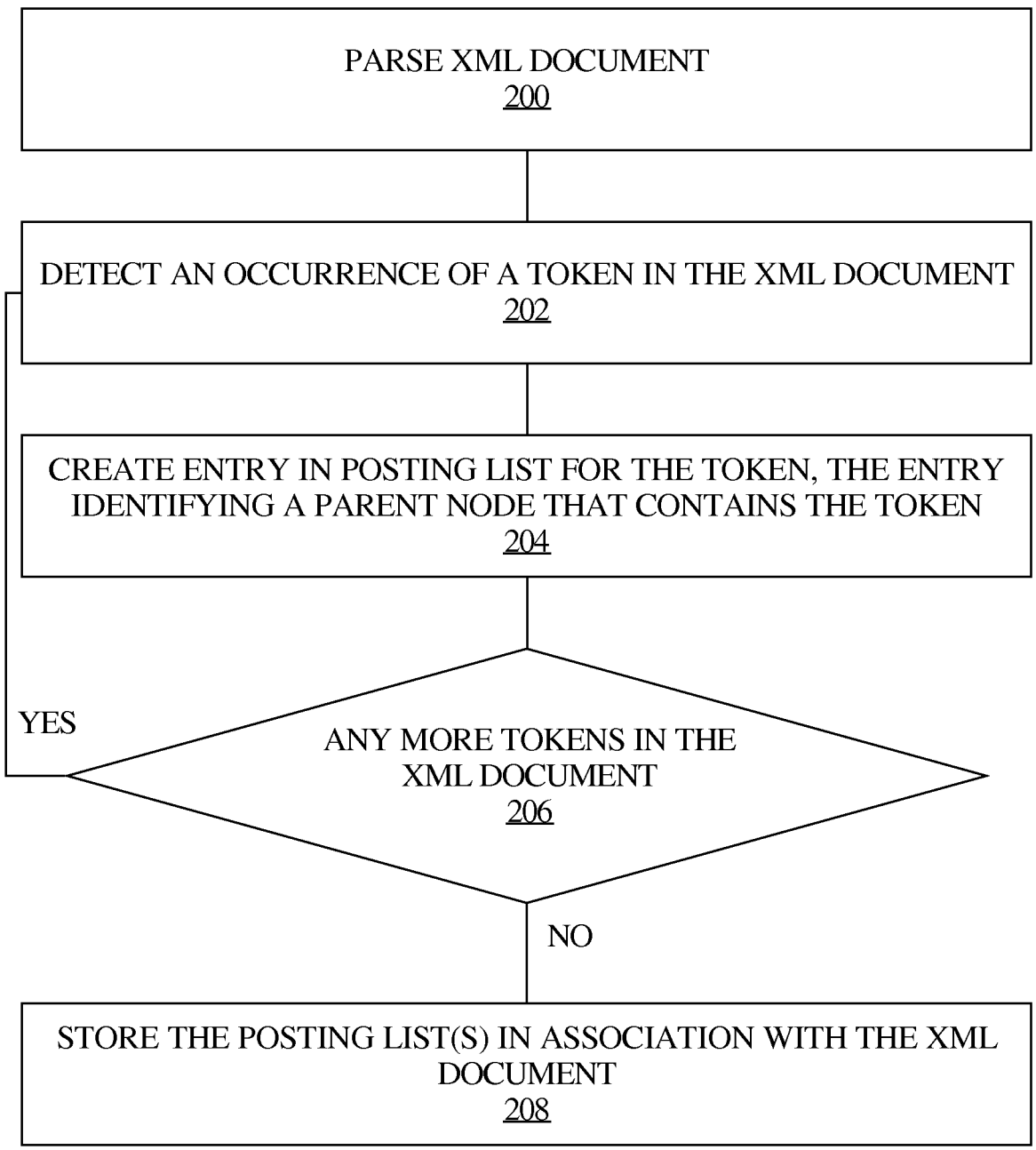
FIG. 2 illustrates an example process for creating posting lists for tokens in an XML document.

FIG. 2 illustrates an example process for creating posting lists for tokens in an XML document. In step 200, an XML parser parses the XML document. The XML parser detects an occurrence of a token in the XML document in step 202, and, in response, creates an entry in a posting list for the token in step 204. The entry may identify a parent node that contains the token. The XML parser then continues to scan the document to determine whether there are any more tokens in the document. If there are more tokens, the process continues at step 202. Otherwise, the process continues at step 208, where the XML parser stores the posting list(s) in association with the XML document.

Figure 4:
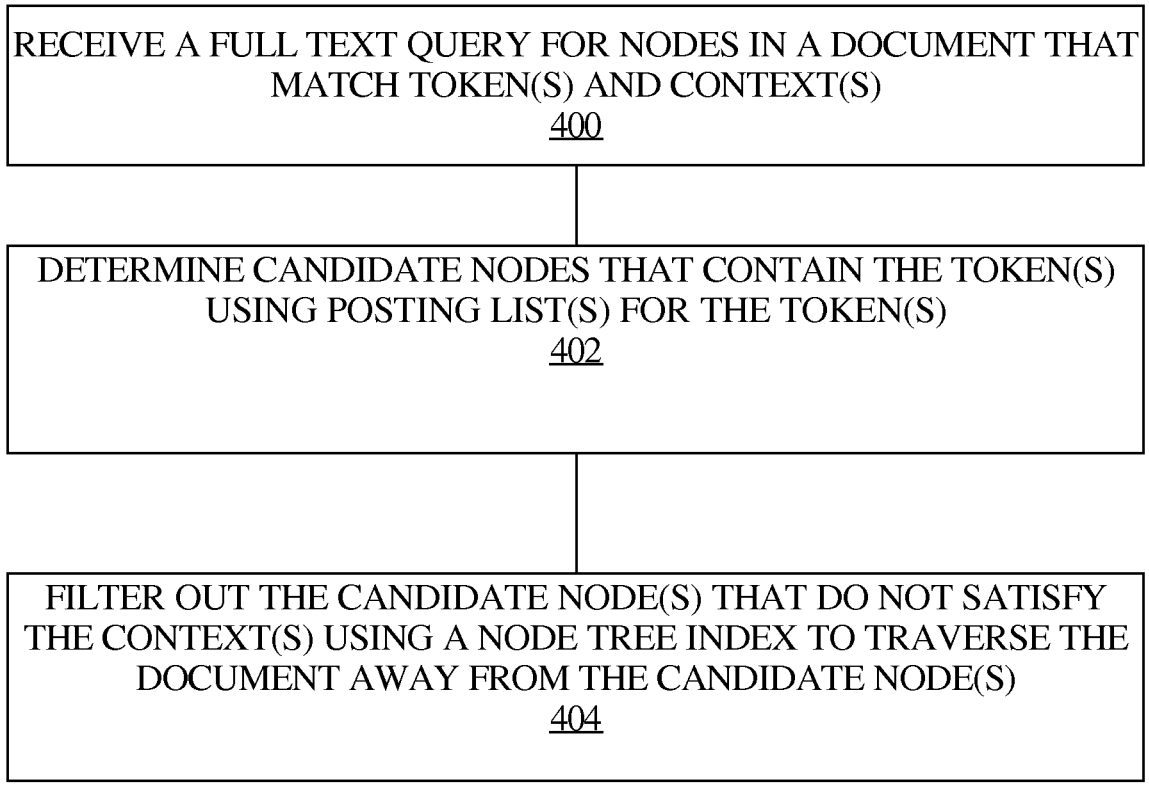
FIG. 4 illustrates an example process for evaluating a full text query against an XML document using posting lists for tokens and a node tree index for the XML document.

FIG. 4 illustrates an example process for evaluating a full text query against an XML document using posting lists for tokens and a node tree index for the XML document. In step 400, a query processor receives a full text query for nodes in a document that match token(s) and context(s). In a bottom-up approach as shown, the query processor may begin with step 402 to determine candidate nodes that contain the token(s) using posting list(s) for the token(s). Then, in step 404, the query processor may filter out the candidate nodes that do not match the context(s) using a node tree index to traverse the document upwardly away from the candidate node(s). Such traversal will end up at node(s) matching the context(s) if the candidate node(s) satisfy the context(s). Otherwise, such traversal will end up at node(s) above the context matching node(s), such as at a root node. In an alternative top-down approach, the query processor may locate the highest-level node(s) that match the context(s) using either the node tree index or another document model. The query processor may then traverse the node tree index downwardly away from the node(s) that match the context(s) to determine whether any of the node(s) matching the token(s) are under the node(s) that match the context(s).

Example Post Index Evaluation

In various embodiments, there can be different XMLType storage models (text clob, object relational and binary XML), the XMLFullText index needs to handle different storage models and provides an efficient XML DOM model to handle post index evaluation.

In one embodiment, an XMLFullText index layer of the database server is able to handle post index evaluation because such evaluation may be more efficient to handle in the index layer rather than in a SQL layer.

In one embodiment, XML Full Text index does post index evaluation instead of passing it onto the SQL layer. XML Full Text index posting list stores docids for efficient pre-sorted merge join. Then the XML Full Text index maps docids into ROWIDs when returning qualified docs to SQL layer which always consumes ROWIDs. The XML full text layer may be enhanced to do post evaluation of XQFT constructs so that the XML full text layer may reduce a number of ROWIDs of qualified XML documents before passing the ROWIDs to the SQL layer. In one embodiment, XML has different storage models. Post index XQFT evaluation may utilize DOM tree of XML documents as XQDM is based on DOM mode. XML Full Text Index creates a persistent DOM tree as index for different XML storage models. This persistent DOM tree can be efficiently converted into in-memory DOM tree that is used by XML Full text index as post evaluation.

Example Conversion of XQFT Expression

In one embodiment, compile time analysis of XQFT usage is performed in SQL/XML so that the XQFT usage can be decomposed using XMLFullText index search primitives and post index evaluation.

In one embodiment, the query processor or optimizer combines multiple XMLExists( ) operators in WHERE clause and converts XQFT usage in XMLTABLE row expression into XMLExists( ) operator using XQFT index. If an XQFT expression appears in an expression that does not null-pad non-matching rows (such as an expression other than an outer join), then that expression may be copied into a filter predicate in the WHERE clause (which also does not preserve null-padding). For a query that operates on a set of rows, null-padding non-matching rows (such as in outer join operations) involves storing, in a result set of rows, null entries for the rows in that do not satisfy join predicates in the query. If the query does not null-pad non-matching rows, then the rows that do not satisfy the join predicates are excluded from the result set. In one example, the full-text expression may appear in the EXISTS operator in the XMLTABLE function, which does not preserve null padding, and the full-text expression may be pushed down into the WHERE clause. The filter predicate may be applied using the progressively narrowing posting list indices rather than requiring evaluation on a row-by-row basis.

In various embodiments, the SQL/XML processor is enhanced with following features to handle XQFT constructs.

In one embodiment, each XMLExists( ) operator having XQFT constructs is analyzed during compile time, and the query processor rewrites these operators such that they use XML Full Text Index primitives. In addition, the query processor may determine whether post index evaluation should be done, or if the query can be completely evaluated using the posting lists. If post-processing should be done, then a post index evaluation query plan is built and sent to XML full text index layer to do post filtering during index lookup time.

In one embodiment, XMLExists( ) operators under the same WHERE clause are analyzed and combined if they query the same XMLType column using XQFT constructs to form a set of XML Full Text Index primitives.

In one embodiment, XQFT usage in row expression of XMLTABLE on the XMLType column is pushed down to XMLEXISTS( ) in a filter predicate to leverage XML Full Text Index.

For example, SELECT v.liname, v.liprice FROM PO, XMLTABLE('$doc/purchaseOrder/lineItems[description contains text "iPhone 5" ] 'PASSING PO.X as "doc" COLUMNS liname varchar2(20) PATH 'linename', liprice NUMBER PATH 'liprice') v is transformed into SELECT v.liname, v.liprice FROM PO, XMLTABLE('$doc/purchaseOrder/lineItems[description contains text "iPhone 5"]' PASSING PO.X as "doc" COLUMNS liname varchar2(20) PATH 'linename', liprice NUMBER PATH 'liprice') v WHERE XMLEXISTS('$doc/purchaseOrder/lineItems[description contains text "iPhone 5"]'PASSING PO.X as "doc")

Example Range Value Search

Range value searches for certain path expressions may be performed against XML data. In one embodiment, the XMLFullText index is enhanced to organize range value(s) for certain path expressions as posting list(s) so that range value search with XQFT keyword search is feasible.

In one embodiment, XML Full Text Index supports range value index with certain xpath expressions using posting list form so that XQFT search and range value search can be combined.

For example, a database server that stores range-compatible data such as dates, times, or numbers may organize the range data sequentially and determine how to divide the data into separate buckets that may be stored as separate posting lists. The range-compatible data may be user-defined as data of a certain type. Also, the posting lists may be created automatically when the data of the certain type is created, or when the user requests creation of an index for a specific dataset. The number of buckets or size of the buckets to hold the ranges of values may be user-configurable or selected by default. For example, a user may specify in a user interface that buckets should have at least or at most 1000 values, or that there should be at least or at most 10 buckets. The data may be split at edges of data values that support the number of buckets or number of values to be stored in each bucket. When range buckets are used, the database server does not need to create and store separate posting lists for each of the values represented in the range buckets.

In one embodiment, a database server detects that one or more of the buckets have expanded or contracted to a size that is outside of a default or user-configurable threshold size. For example, birth date information may initially be stored in separate lists for each month. After time, if few people are born in February, the database server may change the posting list ranges such that the February list also includes some entries from the beginning of the March list. For example, the range February 1-February 29 may be changed to February 1-March 5. The database server may split or combine existing buckets or shift value assignments among the different buckets.

When a query is received that checks for a value that falls within one of the ranges, a posting list that contains that range may be analyzed to determine which documents satisfy the query. Documents are excluded from the result set if they do not fit within the searched range.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
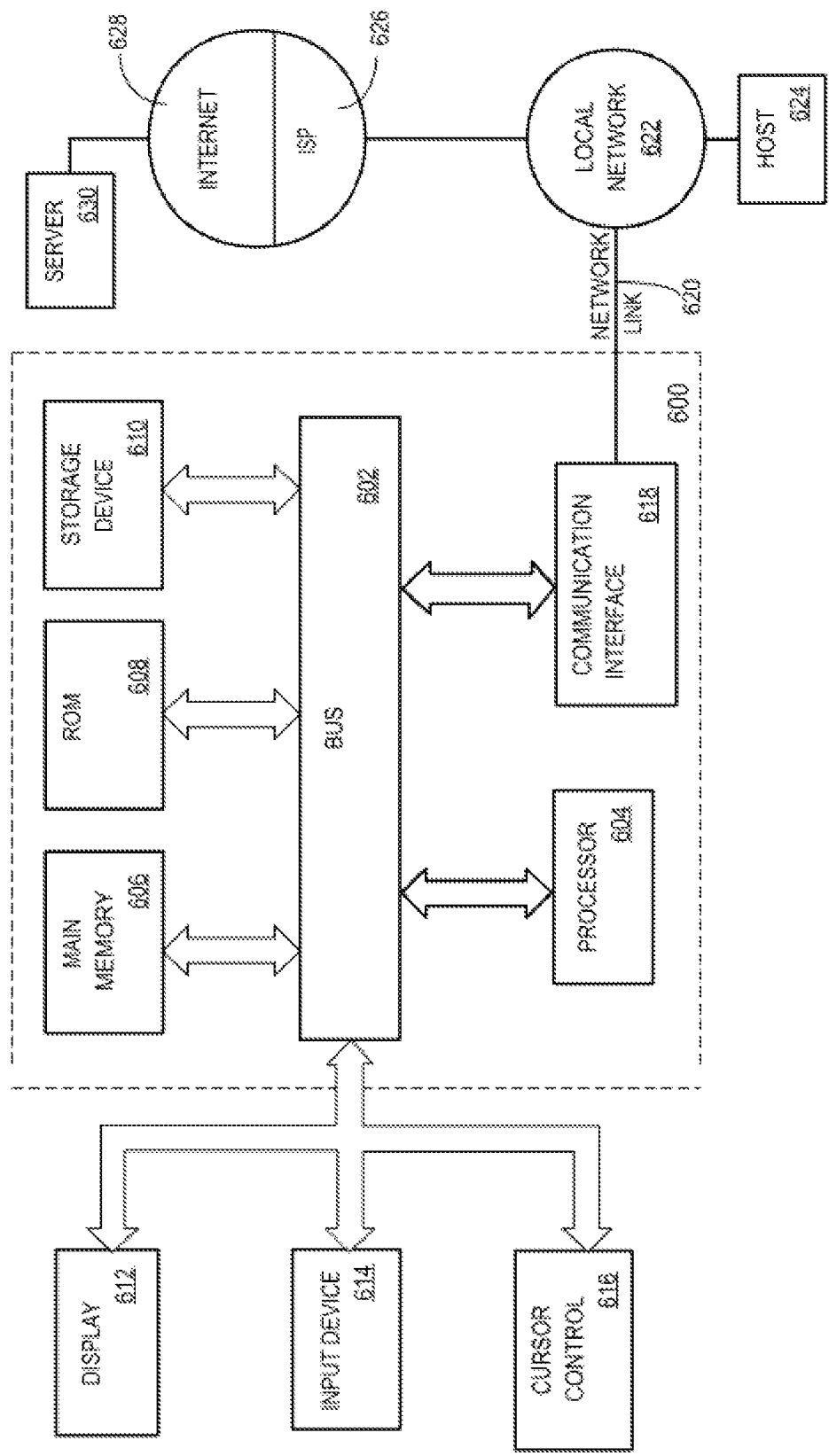
FIG. 6 illustrates an example computer system that may be specially configured to implement various techniques described herein.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a full text query for evaluation against a collection of XML documents, wherein the full text query specifies one or more tokens and one or more contexts, each context of the one or more contexts representing a path expression;
   identifying first one or more documents in the collection that contain the one or more tokens by using one or more token lists that specify tokens contained in the collection of XML documents;
   identifying second one or more documents in the collection that contain at least one element identified by the one or more contexts by using one or more tag lists, the one or more tag lists indexing contexts contained in the collection of XML documents;
   identifying third one or more documents that contain both the one or more tokens and the one or more contexts by determining that one of the first one or more documents in the collection is in the second one or more documents in the collection;
   wherein the one or more token lists maps a particular token, of the one or more tokens that is contained in the first one or more documents, to one or more particular locations within a particular XML document of the third one or more documents;
   wherein the one or more tag lists map a particular context, of the one or more contexts that is contained in the second one or more documents, to a particular range of locations within the particular XML document; and
   evaluating the query based at least in part on the third one or more documents, wherein evaluating the query comprises determining whether the one or more particular locations are within the particular range;
   wherein the method is performed by one or more computing devices.

2. The method of claim 1, wherein the one or more token lists further specify one or more storage locations of the one or more tokens in the collection, and wherein the one or more tag lists further specify one or more storage ranges of storage locations of the one or more tags in the collection, wherein evaluating the query further comprises:
   determining fourth one or more documents that contain the one or more tokens in the one or more contexts from the third one or more documents based at least in part on the one or more storage locations and the one or more storage ranges of storage locations.

3. The method of claim 1, wherein evaluating the query comprises:
   determining, within the particular XML document of the third one or more documents, one or more location ranges of one or more nodes of the particular XML document that match the one or more contexts using a path-based index or by analyzing a model of the particular XML document to determine which nodes contain the at least one element identified by the one or more contexts specified in the query; and
   determining whether the one or more location ranges contain the one or more tokens by using the one or more token lists that specify the one or more particular locations of one or more parent nodes that contain the one or more tokens, wherein the one or more token lists maps the particular token to the one or more particular locations of the one or more parent nodes within the particular XML document.

4. The method of claim 3, wherein the one or more location ranges include:
   a particular parent node of the one or more parent nodes, and
   one or more other nodes that nest the particular parent node within the one or more contexts.

5. The method of claim 1, wherein the query includes one or more XMLExists operators that use XQFT constructs, further comprising rewriting the one or more XMLExists operators to use XML Full Text Index primitives.

6. The method of claim 1, wherein the query includes two or more XMLExists operators under a same WHERE clause, the method further comprising:
   determining whether the two or more XMLExists operators query a same XMLType column using XQFT constructs; and
   in response to determining that the two or more XMLExists operators query the same XMLType column using the XQFT constructs, combining the two or more XMLExists operators to use a set of XML Full Text Index primitives.

7. The method of claim 1, wherein the query includes a WHERE clause and an XQFT expression in an expression that does not null-pad non-matching rows, further comprising copying the XQFT expression into a filter predicate in the WHERE clause.

8. The method of claim 1, wherein the query includes an XMLTABLE expression that uses an XQFT expression, further comprising pushing the XQFT expression down into a WHERE clause, and evaluating the XQFT expression using an XML Full Text Index.

9. The method of claim 1, wherein the one or more contexts comprise a prefix, further comprising mapping the prefix to an XML namespace, and wherein at least two different documents in the collection use different local prefixes to reference the XML namespace, wherein the XML namespace is unique in the collection, and wherein using the one or more tag lists comprises mapping the XML namespace to the at least two different documents.

10. One or more non-transitory storage media storing a set of instructions which, when executed by one or more hardware processors, cause:
    receiving a full text query for evaluation against a collection of XML documents, wherein the full text query specifies one or more tokens and one or more contexts, each context of the one or more contexts representing a path expression;
    identifying first one or more documents in the collection that contain the one or more tokens by using one or more token lists that specify tokens contained in the collection of XML documents;
    identifying second one or more documents in the collection that contain at least one element identified by the one or more contexts by using one or more tag lists, the one or more tag lists indexing contexts contained in the collection of XML documents;

identifying third one or more documents that contain both the one or more tokens and the one or more contexts by determining that one of the first one or more documents in the collection is in the second one or more documents in the collection;

wherein the one or more token lists maps a particular token, of the one or more tokens that is contained in the first one or more documents, to one or more particular locations within a particular XML document of the third one or more documents;

wherein the one or more tag lists map a particular context, of the one or more contexts that is contained in the second one or more documents, to a particular range of locations within the particular XML document; and evaluating the query based at least in part on the third one or more documents, wherein evaluating the query comprises determining whether the one or more particular locations are within the particular range.

11. The one or more non-transitory storage media of claim 10, wherein the one or more token lists further specify one or more storage locations of the one or more tokens in the collection, and wherein the one or more tag lists further specify one or more storage ranges of storage locations of the one or more tags in the collection, wherein the set of instructions comprises instructions which, when executed by the one or more hardware processors, cause:

determining fourth one or more documents that contain the one or more tokens in the one or more contexts from the third one or more documents based at least in part on the one or more storage locations and the one or more storage ranges of storage locations.

12. The one or more non-transitory storage media of claim 10, wherein the set of instructions comprises instructions which, when executed by the one or more hardware processors, cause:

determining, within the particular XML document of the third one or more documents, one or more location ranges of one or more nodes of the particular XML document that match the one or more contexts using a path-based index or by analyzing a model of the particular XML document to determine which nodes contain the at least one element identified by the one or more contexts specified in the query; and determining whether the one or more location ranges contain the one or more tokens by using the one or more token lists that specify the one or more particular locations of one or more parent nodes that contain the one or more tokens, wherein the one or more token lists maps the particular token to the one or more particular locations of the one or more parent nodes within the particular XML document.

13. The one or more non-transitory storage media of claim 12, wherein the one or more location ranges include:

a particular parent node of the one or more parent nodes, and one or more other nodes that nest the particular parent node within the one or more contexts.

14. The one or more non-transitory storage media of claim 10, wherein the query includes one or more XMLExists operators that use XQFT constructs, further comprising rewriting the one or more XMLExists operators to use XML Full Text Index primitives.

15. The one or more non-transitory storage media of claim 10, wherein the query includes two or more XMLExists operators under a same WHERE clause, wherein the set of instructions comprises instructions which, when executed by the one or more hardware processors, cause:

determining whether the two or more XMLExists operators query a same XMLType column using XQFT constructs; and in response to determining that the two or more XMLExists operators query the same XMLType column using the XQFT constructs, combining the two or more XMLExists operators to use a set of XML Full Text Index primitives.

16. The one or more non-transitory storage media of claim 10, wherein the query includes a WHERE clause and an XQFT expression in an expression that does not null-pad non-matching rows, further comprising copying the XQFT expression into a filter predicate in the WHERE clause.

17. The one or more non-transitory storage media of claim 10, wherein the query includes an XMLTABLE expression that uses an XQFT expression, further comprising pushing the XQFT expression down into a WHERE clause, and evaluating the XQFT expression using an XML Full Text Index.

18. The one or more non-transitory storage media of claim 10, wherein the one or more contexts comprise a prefix, wherein the set of instructions comprises instructions which, when executed by the one or more hardware processors, cause mapping the prefix to an XML namespace, and wherein at least two different documents in the collection use different local prefixes to reference the XML namespace, and wherein the XML namespace is unique in the collection, and wherein using the one or more tag lists comprises mapping the XML namespace to the at least two different documents.

* * * * *